(12) United States Patent
Sim et al.

(10) Patent No.: US 8,219,121 B2
(45) Date of Patent: Jul. 10, 2012

(54) BROADCAST DATA AND EVENT TRIGGERS OVER A DIGITAL CELLULAR NETWORK

(75) Inventors: Byung Hoon Sim, San Ramon, CA (US); Syed Zaeem Hosain, San Jose, CA (US); Robert B. Fultz, Boulder Creek, CA (US); Dae Seong Kim, Campbell, CA (US)

(73) Assignee: Aeris Communications, Inc., San Jose, CA (US)

( * ) Notice: Subject to any disclaimer, the term of this patent is extended or adjusted under 35 U.S.C. 154(b) by 579 days.

(21) Appl. No.: 12/408,620

(22) Filed: Mar. 20, 2009

(65) Prior Publication Data
US 2009/0239555 A1 Sep. 24, 2009

Related U.S. Application Data

(60) Provisional application No. 61/038,744, filed on Mar. 22, 2008.

(51) Int. Cl.
*H04W 68/00* (2009.01)
(52) U.S. Cl. ..................... 455/458; 455/414.1
(58) Field of Classification Search .............. 455/458, 455/509, 517, 519, 435; 709/223; 370/355, 370/431, 353, 380, 400, 230, 328, 329; 711/118, 711/152, 163
See application file for complete search history.

(56) References Cited

U.S. PATENT DOCUMENTS

| | | | |
|---|---|---|---|
| 2002/0197994 A1* | 12/2002 | Harris et al. | 455/445 |
| 2005/0255845 A1* | 11/2005 | Leuca et al. | 455/427 |
| 2007/0105531 A1* | 5/2007 | Schroeder | 455/411 |
| 2007/0111738 A1* | 5/2007 | Redell et al. | 455/456.3 |
| 2008/0005306 A1* | 1/2008 | Kushalnagar et al. | 709/223 |
| 2009/0019141 A1* | 1/2009 | Bush et al. | 709/223 |
| 2009/0180444 A1* | 7/2009 | McManus et al. | 370/332 |

OTHER PUBLICATIONS

Motorola, "Advisor II, One Way POCSAG Alphanumeric Pager," features and specifications, Rev. 10/04, 2 pgs.
Cambridge Telecom Report: "Motorola Announces Significant Upgrade to ReFLEX Two-Way Messaging Protocol; Enhancement Helps Offer Improved Capabilities for Two-Way Paging Networks—Company Business and Marketing," http://findarticles.com/p/articles/mi_m0BF/is_1999_Oct_25/ai_572392..., Oct. 25, 1999, 1 pg.
Motorola Tango TwoWay Pager, "ReFLEX Protocol Technology Enables Wireless Access to the World Wide Web," http://wireless.per.nl/reference/chaptr01/dtmmsyst/flex.htm, retrieved from the internet on Mar. 21, 2008, 2 pgs.
Skytel, an MCI WorldCom Company, "Sky Pager Service Instructions," Apr. 2000, 12 pgs.
3G 3rd Generation Partnership Project 2 "3GPP2","International Implementation of Wireless Telecommunication Systems Compliant with TIA/EIA-41, Revision: B," 3GPP2 N.S0017-B, Version 1.0.0, Version Date: Dec. 2002, 13 pgs.

* cited by examiner

*Primary Examiner* — Kamran Afshar
*Assistant Examiner* — Kenneth Corbin
(74) *Attorney, Agent, or Firm* — Blakely, Sokoloff, Taylor & Zafman

(57) ABSTRACT

A system and method for enabling a service provider to select one or more digital cellular markets to receive a broadcast page, wherein each digital cellular market provides wireless communication services to a geographic region. The service provider to generate a broadcast page indicating a Virtual Device Identifier, the Virtual Device Identifier associated with a plurality of remote devices in each of the digital cellular markets selected, and wherein each of the remote devices includes a Primary Device Identifier uniquely identifying the remote device within the digital cellular markets, and wherein each of the remote devices further includes the Virtual Device Identifier associated with the plurality of remote devices. The service provider to further send the broadcast page to each digital cellular market selected, for transmission to the remote devices to send a message to remote devices having the Virtual Device Identifier.

23 Claims, 8 Drawing Sheets

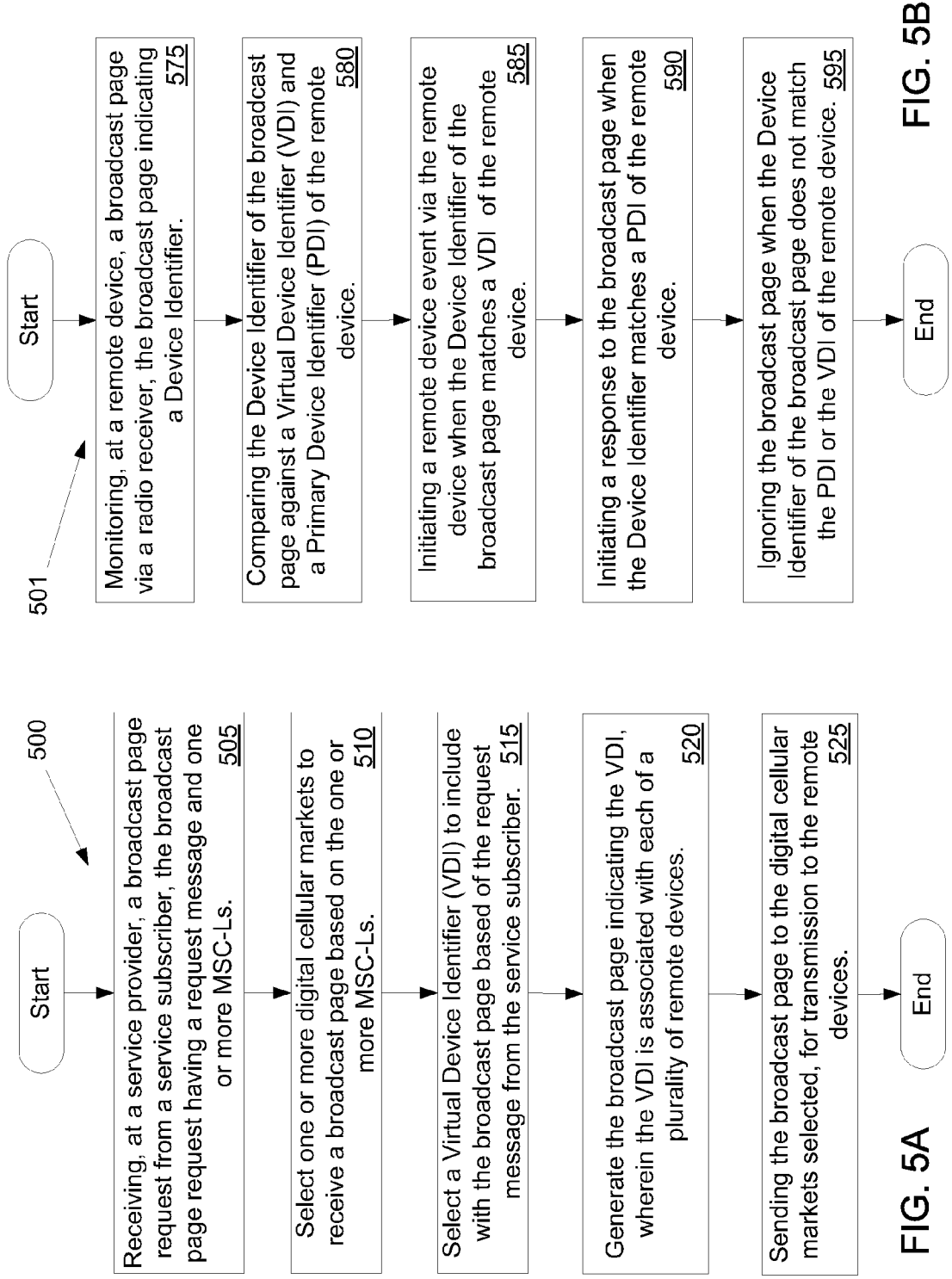

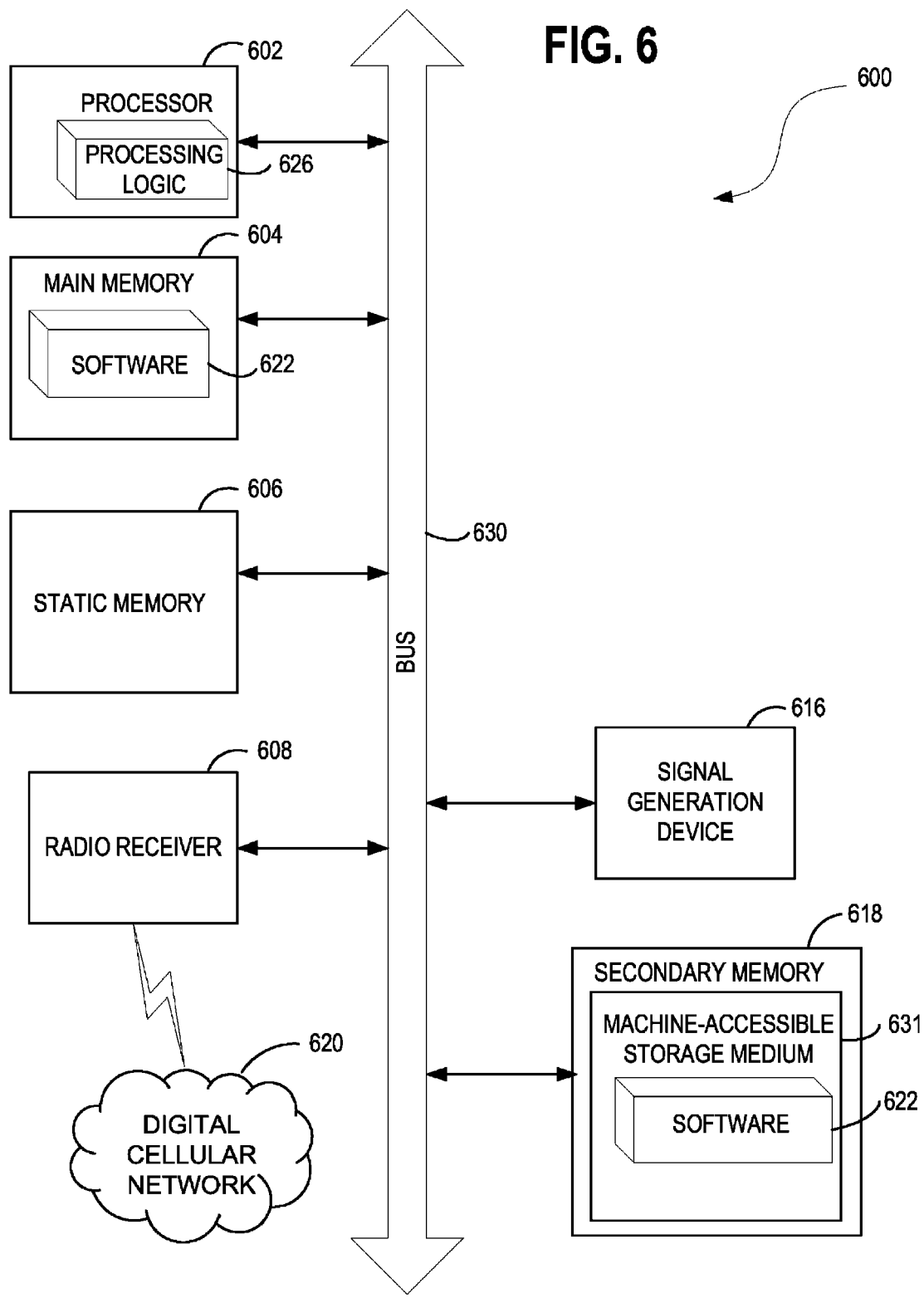

BROADCAST DATA AND EVENT TRIGGERS OVER A DIGITAL CELLULAR NETWORK

CROSS-REFERENCE TO RELATED APPLICATIONS

This application is related to, and claims priority to, the provisional application entitled "Broadcast Data and Event Triggers Over a Digital Cellular Network," filed on Mar. 22, 2008, having an application number of 61/038,744.

TECHNICAL FIELD

Embodiments of the invention relate to the field of digital cellular network communications, and more particularly, to a system and method for broadcasting data and event triggers to multiple remote devices via paging and related mechanisms of the digital cellular network.

BACKGROUND

Paging systems exist that allow a customer to initiate a page request via a service provider, and have that page message sent to, and acted upon by a specified remote device, such as a numeric pager.

A familiar example would be an implementation of the SkyTel™ paging network which allows users to dial a toll free number, enter a remote pager ID via a telephone menu, and then enter a brief message, typically a telephone number. The SkyTel™ system then communicates the message or phone number to the pager device identified by the remote pager ID via the SkyTel™ pager network.

Paging networks, such as the one-way paging network POCSAG ("Post Office Code Standardization Advisory Group"), PageNet™ (Paging Network, Inc.) and Motorola's "ReFLEX" paging network transmitted paging communications via Frequency Modulated (FM) bands which provided the benefit of having broad coverage, nationwide in many circumstances, but suffered from a narrow Federal Communications Commission (FCC) sanctioned spectrum limiting message size and message volume.

FM based paging networks enjoyed tremendous growth during the late 1980s and early 1990s until the industry peaked during the mid to late 1990s. In the late 1990s, cellular telephone adoption was increasing at a dramatic rate and the FM based paging industry declined quickly.

One active niche market for paging networks is by utility companies to control energy consuming devices within their consumer base for the purpose of smoothing energy demand and improving the efficiency of energy utilization.

In recent years, utility companies have strived to increase their efficiency by reducing the delta between a maximum and minimum amount of energy demand, thus bringing the average energy demand nearer to a predictable baseline of energy demand for the utility company. Unanticipated periods of "peak demand" require utility companies to purchase additional energy capacity from a secondary "spot market" at a much higher cost. Through the use of paging systems, a utility company can instruct multiple remote devices, such as air-conditioning units, to switch off, or otherwise reduce their energy demand, thereby "smoothing" the energy demand, and reducing the utility's overall cost of operation.

Unfortunately, even as utility companies work to develop their capabilities with smoothing energy demand through the remote control of energy consuming appliances, the very mechanism the utility companies use to communicate with the remote devices has been rendered nearly obsolete, and it is unclear for how long FM based paging systems will be available. Furthermore, as the FM based paging system providers lose subscribers and revenue, scales of efficiency are also lost, and an ever-decreasing pool of paying subscribers (e.g., the utility company) must cover the fixed costs associated with the infrastructure, thus increasing the cost to facilitate the energy smoothing programs.

Although the use of digital cellular technology is primarily responsible for the decline of FM based paging networks, it has been heretofore believed that digital cellular networks are incapable of broadcasting a single message to multiple cellular devices simultaneously, due to inherent design characteristics of digital cellular networks. For example, Code Division Multiple Access (CDMA) digital cellular networks identify and communicate with remote devices through the use of Device Identifiers (e.g., a Mobile Identification Number (MIN), a unique 10-digit number, or an International Mobile Subscriber Identifier (IMSI), a unique 15-digit number), that identify a particular remote device operating within a digital cellular communication network. As an additional example, Global System for Mobile communications (GSM) digital cellular networks also identify and communicate with remote devices through the use of an IMSI. Each remote device only "listens for" or reacts to messages and information that are directed toward its particular Device Identifier.

Because each remote device on a digital cellular network is associated with a single unique Device Identifier, a utility company wishing to contact a group of remote devices to send data, or trigger an event, faces two critical problems. First, initiating individual messages to each individual remote device via its unique Device Identifier is cost prohibitive as the utility company must pay a third-party cellular provider for each individual message sent. This would be akin to making thousands of short individual phone calls or sending thousands of text messages or initiating thousands of separate cellular Internet Protocol (IP) data sessions, each time the utility company wishes to send data or trigger a remote event in multiple remote devices. The third-party cellular provider requires compensation for the use of its network infrastructure. Generating potentially thousands of calls or messages or data sessions in a short period of time would induce a massive amount of traffic, and thus, is very expensive compared with sending a single page to multiple remote devices simultaneously over the FM based paging networks.

Secondly, because the messages must be individually addressed and transmitted to each individual remote communication device via its unique Device Identifier, the length of time required to communicate instructions to the remote devices increases dramatically as the volume of outgoing messages increases. For a utility company to benefit from small decreases in energy consumption among individual energy consuming appliances, the utility company must orchestrate a corresponding energy decrease among thousands and potentially tens of thousands of such appliances within the utility company's service area. Any delay in communicating the required instructions could potentially obviate much of the potential benefit of instructing a large number of energy consuming appliances to scale back during a period of peak energy demand. This problem is exacerbated if the peak demand is unanticipated and the utility company is attempting to quickly reduce overall system demand.

BRIEF DESCRIPTION OF THE DRAWINGS

The present invention is illustrated by way of example, and not by way of limitation, and can be more fully understood with reference to the following detailed description when considered in connection with the figures in which:

FIG. 5A is a flow diagram illustrating a method at a service provider for generating and sending broadcast pages to multiple remote devices, in accordance with an embodiment of the present invention;

FIG. 5B is a flow diagram illustrating a method at a remote device for monitoring broadcast pages and initiating remote device events based on select broadcast pages, in accordance with another embodiment of the present invention; and FIG. 6 illustrates a diagrammatic representation of a machine in the exemplary form of a computer system, in accordance with a particular embodiment.

DETAILED DESCRIPTION

Figure 1:
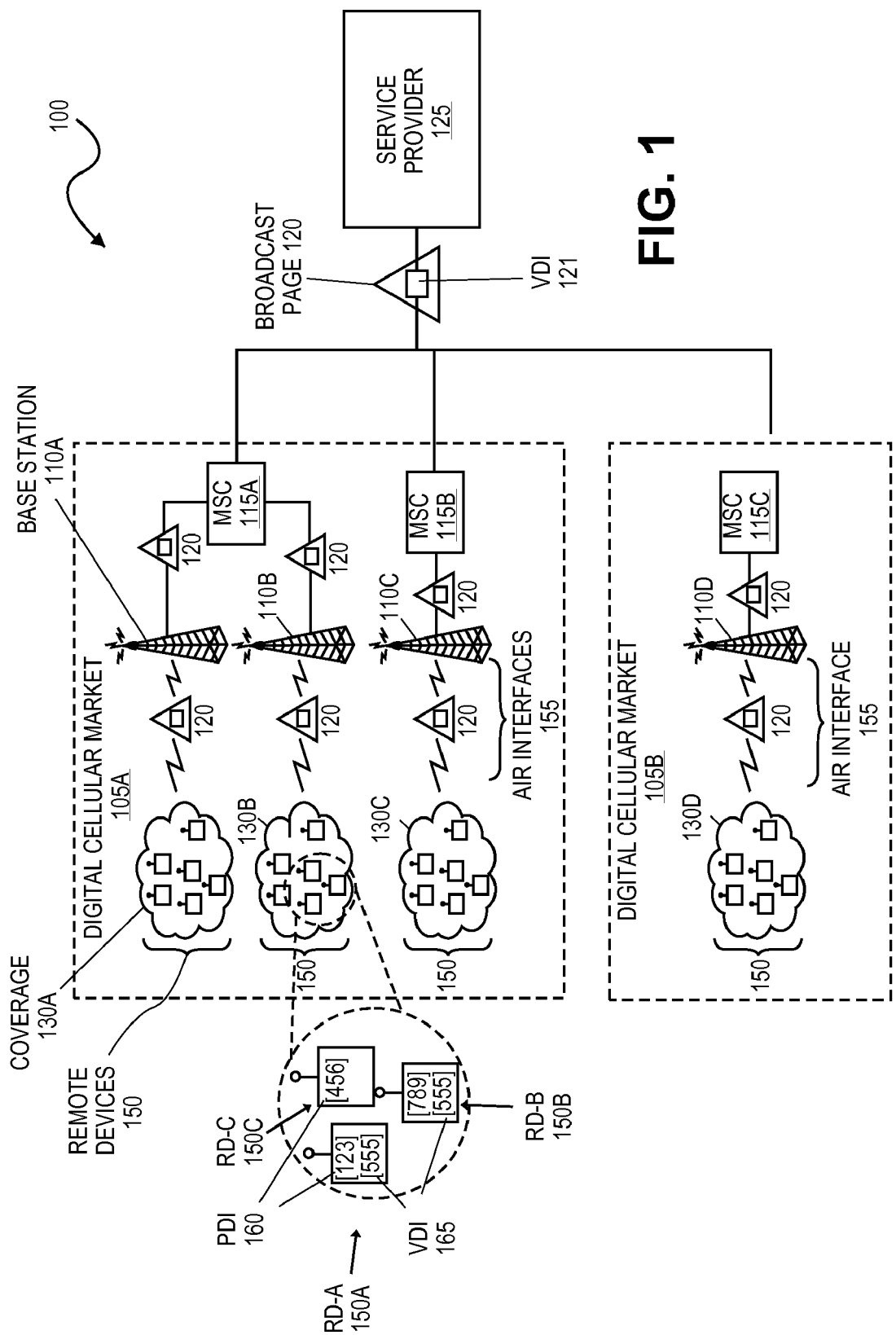
FIG. 1 illustrates an exemplary digital cellular network in which embodiments of the present invention may operate.

Described herein are a system and method for enabling multiple remote devices operating in a digital cellular network to receive broadcast pages from a service provider. In one embodiment, a service provider selects one or more digital cellular markets to receive a broadcast page. The digital cellular markets each provide wireless communication services to a geographic region, for example, cellular phone service to a particular city, a metropolitan area, or to rural areas. The service provider generates a broadcast page indicating a Virtual Device Identifier (VDI) associated with multiple remote devices in the digital cellular markets selected by the service provider. Each remote device includes a Primary Device Identifier (PDI) which uniquely identifies the remote device within the digital cellular markets. Each remote device further includes one (or more) Virtual Device Identifier(s) which is associated with multiple remote devices. In this embodiment, the service provider further sends the broadcast page to the digital cellular markets selected, for transmission to the remote devices.

Also described herein is a remote device enabled to receive a broadcast page sent via a digital cellular network indicating a Virtual Device Identifier that is associated with multiple remote devices. The remote device initiates a remote device event based on the Virtual Device Identifier received via the broadcast page. In one embodiment, a remote device has a radio receiver to monitor broadcast pages from a digital cellular network, a Primary Device Identifier uniquely identifying the remote device among all remote devices communicably attached with the digital cellular network, and an index comprising one or more index locations. Each of the index locations map a Virtual Device Identifier associated with a plurality of remote devices to a remote device event. The remote device event describes an operation to be initiated by the remote device in response to receipt of a broadcast page that indicates a Virtual Device Identifier associated with the remote device. The remote device also has logic to trigger the remote device event when a mapped Virtual Device Identifier is monitored at the remote device within a broadcast page.

Practice of the disclosed systems and methods enable a service provider to transmit broadcast pages over a digital cellular network to multiple remote devices simultaneously via a Virtual Device Identifier, without the need to send a message or a page event to each of the remote devices individually through use of a Primary Device Identifier associated uniquely with each of the remote devices.

Similarly, practice of the disclosed remote devices enable each remote device to initiate a remote device event responsive to a broadcast page directed at multiple remote devices, each associated with a particular Virtual Device Identifier. Each remote device then in turn triggers a mapped remote device event based on the Virtual Device Identifier broadcast and based further on the location of the Virtual Device Identifier in an index. The remote device is able to monitor for and react to the broadcast pages without the broadcast page indicating the unique Primary Device Identifier that is assigned or registered to a particular remote device.

In the following description, numerous specific details are set forth such as examples of specific systems, languages, components, etc., in order to provide a thorough understanding of the present invention. It will be apparent, however, to one skilled in the art that these specific details need not be employed to practice the present invention. In other instances, well known materials or methods have not been described in detail in order to avoid unnecessarily obscuring the present invention.

The present invention includes various operations, which will be described below. The operations of the present invention may be performed by hardware components or may be embodied in machine-executable instructions, which may be used to cause a general-purpose or special-purpose processor programmed with the instructions to perform the operations. Alternatively, the operations may be performed by a combination of hardware and software.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method operations. The required structure for a variety of these systems will appear as set forth in the description below. In addition, the present invention is not described with reference to any particular programming language. It will be appreciated that a variety of programming languages may be used to implement the teachings of the invention as described herein.

The present invention may be provided as a computer program product, or software, that may include a machine-readable medium having stored thereon instructions, which may be used to program a computer system (or other electronic devices) to perform a process according to the present invention. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory (ROM), random access memory (RAM), magnetic disk storage media, optical storage media, flash memory devices, etc.).

Embodiments of a mechanism for enabling a service provider to send broadcast pages to multiple remote devices via a digital cellular network as well as embodiments of a mechanism for enabling a remote device to monitor for and react to a broadcast page transmitted via a digital cellular network indicating a Virtual Device Identifier are discussed in more detail.

An exemplary remote device may be a cellular telephone, a cellular compatible control unit connected with an electrical appliance, such as a control unit capable of switching on or off an air-conditioning system based on a broadcast page, or a public alert system enabled to receive broadcast pages over a digital cellular network and initiate a particular public warning, announcement, or alert, based on a broadcast page received.

Some remote devices have native capabilities allowing them to monitor for and react to a page event indicating a Primary Device Identifier. However, each Primary Device Identifier is completely ignored by all remote devices operating on a digital cellular network, except for the one unique remote device that is assigned or registered to the Primary Device Identifier. A remote device associated with the Primary Device Identifier sent via the page event responds to the page event by initiating a communication with the digital cellular network, for example, to establish a voice communication call or to receive additional information on a dedicated channel, such as a voice mail notification or a text message.

In contrast to conventional systems, embodiments of the present invention provide enhanced functionality for service providers interfaced with digital cellular networks and for remote devices operating or in communication with digital cellular networks by providing a mechanism for initiating remote events through multiple remote devices without having to send individual page events to every unique remote device to be notified.

In one example, a public utility may deploy hundreds of remote devices within the utility's service area and attach each remote device to an industrial electrical motor, such as an air-conditioning unit or an air-compressor unit in a factory. In this example, the remote devices are each configured to perform three basic events responsive to three distinct broadcast pages. Specifically, the remote devices are configured to recognize three Virtual Device Identifiers, such as #123, #456, and #789. Each unique Virtual Device Identifier is then associated with a particular remote device event, so that when a recognized Virtual Device Identifier is monitored by the remote device within a broadcast page, the remote device performs the event associated with the Virtual Device Identifier indicated by the broadcast page. For example, the remote device may trigger the industrial electrical motor to adjust down to 50% power responsive to a broadcast page having a Virtual Device Identifier of #123, adjust to 75% power responsive to a broadcast page having a Virtual Device Identifier of #456, and adjust to default power or full power responsive to a broadcast page having a Virtual Device Identifier of #789. Furthermore, the same Virtual Device Identifier could trigger different operations at different remote devices, each configured to respond to the common Virtual Device Identifier in a unique way.

When a system or an operator at the utility determines that power demand needs to be reduced within its service area, the utility can send a request to a service provider specifying a market or markets affected, and further provide a message pertaining to its request. For example, the message may indicate the utility is requesting that industrial electrical motors connected with the remote devices be reduced to 50% power. The service provider then in turn determines a Virtual Device Identifier that corresponds with such a request and transmits the Virtual Device Identifier to the remote devices via a digital cellular network or networks based on the utility's request. The Virtual Device Identifier is sent to the remote devices via a broadcast page, enabling all remote devices operating within the particular networks to monitor for (e.g., "see," or "hear") the Virtual Device Identifier.

The remote devices deployed by the utility monitor the digital cellular network for broadcast pages. When a broadcast page is determined by the remote devices to have a matching Virtual Device Identifier, the remote devices initiate the remote device event mapped to the particular Virtual Device Identifier received. When the Virtual Device Identifier #123 is received, the remote devices trigger the corresponding operation, which is to reduce the connected industrial electrical motor to 50% based on the remote device configuration.

Numerous other examples are possible as will be understood by those having skill in the art. For example, a broadcast page sent from a service provider could trigger hundreds of public warning system in a coastal area to announce that a Tsunami is approaching. A broadcast page could trigger the same public warning system to announce information about a child-abduction or some other event of the kind that the public should be urgently notified. Another example could be an announcement at a particular University campus about a crisis or other emergency condition. Yet another example related to utilities could be a remote device that triggers emergency shut-off valves on water or gas lines. For example, a utility may wish to ensure that all emergency shut-offs are triggered as quickly as possible after an earthquake is detected.

Other less critical applications are also feasible, such as a user registering a compatible cell phone to receive stock market updates. A service provider could send out a single stock market update indicating the value of the Dow Jones Index, for example, at the close of market. Since the same information (e.g. the Dow's value) is being sent to all registered users, it would be far more efficient to send a broadcast page, indicating a common Virtual Device Identifier associated with each of the compatible cell phones, rather than sending individual page events to thousands of individual cell phones, each addressed via its Primary Device Identifier. The reduced network usage would also expedite the transmission of the information to the multiple destinations and reduce usage costs on the digital cellular network.

FIG. 1 illustrates an exemplary digital cellular network architecture 100 in which embodiments of the present invention may operate. The architecture 100 may include Digital Cellular Market (DCM) 105A and 105B, which includes base stations 110A-D that interface with a Mobile Switching Center (MSC), such as MSCs 115A-C. A digital cellular market 105 may correspond with a geographic region, such as a city, a portion of a city, a metropolitan area, or a large regional area. Each digital cellular market 105 is serviced by one or more MSCs 115, each of which provides wireless coverage via multiple base stations 110. The base stations 110 are geographically dispersed throughout an area, to provide wireless access to remote devices in the coverage area 130 of the base station and transmit information between wireless or remote devices 150 and the MSCs 115.

The MSCs function as gateways to the Public Switched Telephone Network (PSTN), enabling the wireless devices such as cellular telephones to make and receive calls with land-line based telephones or wireless devices on other networks. MSCs 115 also provide network access to a carrier that operates the digital cellular network 105. Through the carrier's network, remote devices 150 and other wireless devices on the carrier's network can access the Internet or communicate with other remote devices 150 on the network without having to traverse the PSTN. The number of MSCs 105 varies with each digital cellular market 105. For example, a small city may have only one MSC 115 and a dozen or so base stations 110 providing wireless coverage 130 for the entire small city. Conversely, a very large city may have multiple MSCs 115, and hundreds of base stations 110.

In one embodiment, service provider 125 selects digital cellular market 105B corresponding with a small city and sends broadcast page 120 to a single MSC 115C providing wireless access to the small city. In another embodiment, SP 125 selects DCM 105A corresponding with a large geographic area, such as a large city, and sends broadcast page 120 to each of the MSCs 115A and 115B in that city. In this embodiment, SP 125 sends the same broadcast page 120 to each MSC 115A-B individually to reach all the remote devices 150 in coverage areas 130A, 130B, and 130C.

Base stations 110 communicate with remote devices 150 via air interface 155, for example, a wireless communication interface, such as a Code Division Multiple Access (CDMA) compatible wireless communications protocol for digital cellular communications or a Global System for Mobile communications (GSM) compatible wireless communication protocol. When base stations 110 broadcast page events, such as broadcast page 120, the page event is communicated throughout the coverage area 130, and therefore, broadcast pages 120 are capable of being monitored by all remote devices 150 in a given coverage area, such as coverage area 130A associated with base station 110A. Stated differently, all remote devices 150 can "hear," "see," "listen," or detect the broadcast pages 120 sent via base stations 110, and determine whether or not to perform any action based on a Device Identifier within each broadcast page.

The overwhelming majority of page events communicated within a coverage area 130 are simply ignored by the remote devices 150 in that coverage area, because each individual remote device is unlikely to be the intended recipient of the page event. This is because each most currently deployed remote device is assigned only a single unique Device Identifier, or a Primary Device Identifier as referred to herein. When an MSC needs to alert a particular remote device, for example to send a notification, such as a voice mail event, a text message event, or an incoming voice communication event, the MSC determines the Primary Device Identifier for that remote device and broadcasts a page event indicating or including the Primary Device Identifier for that remote device.

For example, in an embodiment, MSC 115A sends Primary Device Identifier 160 with a value of "123" to base stations 110A and 110B for broadcast to coverage areas 130A and 130B, thereby notifying all the remote devices 150 in those coverage areas that MSC 115A is attempting to initiate contact with the remote device corresponding (e.g., assigned or registered) to Primary Device Identifier value "123." Each remote device 150 monitoring for page events will see the page indicating Primary Device Identifier value "123," however, only remote device 150A having a Primary Device Identifier value of "123" will actually process the page event, for example, by responding to MSC 115A.

Because some remote devices each have only a Primary Device Identifier 160 by which they may be addressed by MSCs 115, each unique remote device 150 must be contacted individually, even if identical information is being sent to a large population of remote devices. In some remote devices, such as cellular phones, the Primary Device Identifier is stored on a Subscriber Identity Module (SIM) card or Removable User Identity Module (R-UIM) card, so that when a user changes from one cellular phone to another, the user must only transfer the SIM or R-UIM card, containing the Primary Device Identifier, and the subsequent cellular phone will be enabled to access services on the digital cellular network, as well as monitor for, and react to page events indicating a Primary Device Identifier 160 associated with the SIM or R-UIM card.

A Primary Device Identifier (e.g. Primary Device Identifier 160) refers to the unique number that a wireless operator traditionally uses to identify remote devices 150 operating on its network. For example, MINs are described in detail under Telecommunication Industry Association (TIA) standards for current generation Cellular and PCS technologies (e.g. EIA/TIA 553 analog, IS 136 TDMA, IS 95, ANSI-2000 CDMA, and others). Other unique identifying numbers for remote devices may also be used, such as an IMSI, also a unique number, associated with CDMA, GSM, Universal Mobile Telecommunications System (UMTS) and other next-generation network mobile phones.

Virtual Device Identifiers 165 on the other hand are not unique to a particular remote device, but rather, may be common to multiple remote devices, such as Virtual Device Identifier #555 as shown which is associated with remote devices 150A and 150B. Virtual Device Identifiers may be stored on a SIM or R-UIM card, allowing the Virtual Device Identifiers to be moved to a subsequent remote device simply by installing the SIM or R-UIM card into the subsequent remote device. This is not possible using only Primary Device Identifiers without the aid of Virtual Device Identifiers. Similar to page events described above, MSCs 115 may transmit broadcast pages 120 to all remote devices in digital cellular markets 105 or to a subset of remote devices 150, such as those operating in coverage areas 130 serviced by MSC 115A, or those serviced by 115C. When a broadcast page 120 is transmitted, all remote devices within communication range monitoring for broadcast pages or page events will "hear" the broadcast page, however, only the remote devices 150 associated with Virtual Device Identifier 121 indicated by broadcast page 120 will react to the broadcast page. The remote devices not having a Virtual Device Identifier 165 matching the indicated Virtual Device Identifier 121 will simply ignore the broadcast page.

For example, in one embodiment, MSC 115C receives broadcast page 120 from SP 125 and transmits broadcast page 120 to base station 110D which transmits the broadcast page to coverage area 130D and all the remote devices 150 in it. Broadcast page 120 indicates a Virtual Device Identifier value 121 of "555" which matches remote devices 150A and 150B. Remote devices 150A and 150B monitor for broadcast pages and when each remote device determines that Virtual Device Identifier value 121 matches a Virtual Device Identifier of the remote device (150A or 150B), the remote device processes the broadcast page, usually performing or initiating some kind of a remote device event. For example, triggering an air conditioner to reduce its power consumption.

A Virtual Device Identifier, also referred to as a "Secondary Device Identifier," may be associated with dozens, hundreds, or thousands of remote devices, depending on the application. It is also possible to have a Virtual Device Identifier associated with only a single device, or two or three devices, and transmit broadcast pages to those devices. However, greater efficiencies result from greater numbers of remote devices having a common Virtual Device Identifier (e.g. Virtual Device Identifier 165). Moreover, Virtual Device Identifier 165 may be reprogrammed dynamically and remotely from service provider 125, a function that is not possible with Primary Device Identifiers 160. Also, a single remote device 150 may have multiple Virtual Device Identifiers, limited only by usual constraints, such as memory and storage space, whereas remote devices allowing only a single Primary Device Identifier cannot detect page events destined for multiple remote devices via a common indicator, such as a Virtual Device Identifier. Assigning a single Primary Device Identifier 160 to multiple remote devices 150 would cause ambiguity within the digital cellular network as to which device is being contacted or connected to an incoming voice communication.

Figure 2:
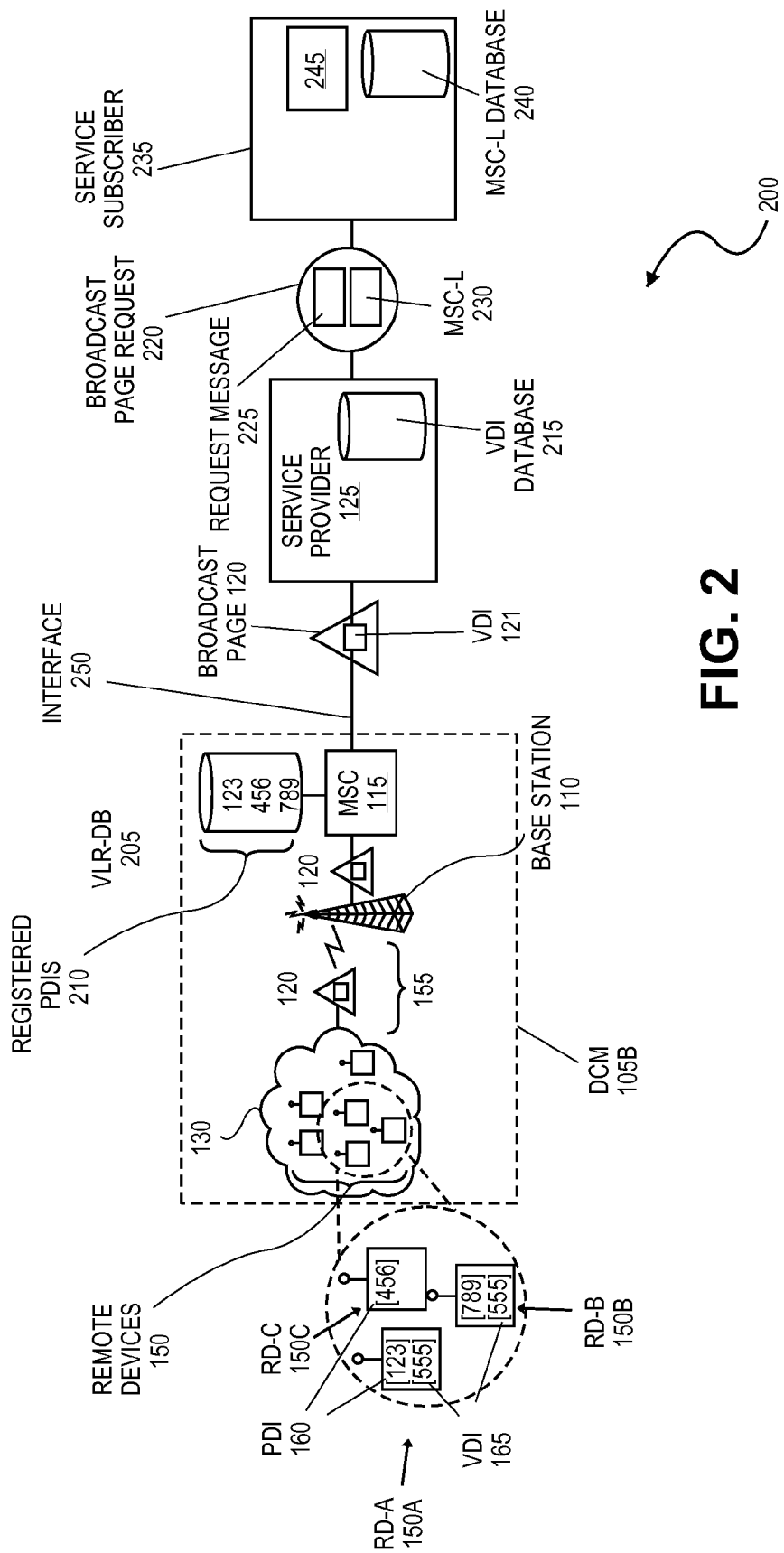
FIG. 2 illustrates an embodiment of a service provider to generate broadcast pages responsive to inputs from a service subscriber.

FIG. 2 illustrates an exemplary service provider 125 in a digital cellular network architecture 200 to generate broadcast pages 120 responsive to inputs from a service subscriber 235, in accordance with one embodiment of the invention.

Service subscriber 235 is shown sending broadcast page request 220 to a service provider 125. Service subscriber 235 may be any type of a subscribing customer. Examples include utility companies, such as electrical, natural gas, and water utilities, each of which may have a desire to control electronic devices (e.g. altering the energy consumption of an electrical device or appliance) or electromechanical devices (e.g. valves, switches, intakes, backflows, etc.) remotely. Customers may include government entities such as police, fire, and rescue, or groups responsible for broadcasting public warning messages, such as a weather monitoring service or a service that monitors for earthquakes, floods, Tsunamis, etc. Government customers desire to broadcast, for example, an "AMBER Alert" to a large group of remote devices 150.

Service subscriber 235 has a Mobile Switching Center Listing (MSC-L) database 240 and an event monitor 245. Broadcast page request 220 includes request message 225 and MSC-Ls 230. The MSC-L database can include a list of MSC 115 identifiers for particular DCMs 105 in which the service subscriber has remote devices 150 deployed, or other identifying information that allows the service subscriber 235 to specify the digital cellular markets (e.g., 105A-B) that service provider 125 is to send broadcast pages to. For example, the service provider 125 may keep the actual MSC-Ls locally, and instead provide service subscribers 235 with descriptions or codes of DCMs 105, such as "Portland," or "Los Angeles," or "Manhattan," and so forth.

Service subscriber 235 has an event monitor 245 that allows it to automatically initiate a broadcast page request 220 upon the occurrence of some event to be monitored. For example, event monitor 245 may trigger a broadcast page request 220 when an earthquake is detected, or an event monitor 245 located at an electric company may trigger a broadcast page request 220 requesting electrical appliances to reduce their energy consumption when a threshold of energy demand is surpassed.

In one embodiment, service subscriber 235 is a natural gas utility and event monitor 245 determines that an anomaly has occurred with gas back pressure in a particular service grid. Service subscriber 235 transmits a broadcast page request to service provider 125 including an MSC-L 230 from MSC-L database 240 corresponding to the geographic area associated with the anomaly and further including in the broadcast page request 220, a request message 225 describing the event detected at event monitor 245.

When service provider 125 receives broadcast page request 220, it determines an appropriate Virtual Device Identifier 121 to broadcast based on the request message 225 included with the broadcast page request 220. For example, the same service subscriber 235 may have multiple event codes or request message types 225 that are used, and each may be associated with a different Virtual Device Identifier 121 based on which remote devices 150 the service subscriber 235 determines should be reached and based further on what action the service subscriber 235 determines those remote devices 150 should perform upon receipt of a broadcast page 120.

In some instances, the service subscriber 235 may send multiple broadcast page requests 220 in order to reach multiple groups of remote devices 150 or to have remote devices 150 perform multiple actions. Furthermore, a single Virtual Device Identifier could trigger multiple operations at the remote device or at multiple remote devices, or trigger a chain of operations having a series of different events at the remote device(s).

When service provider 125 receives broadcast page request 220, it determines the appropriate MSCs 115 or DCMs 105 to transmit broadcast page 120 to, based upon the MSC-L list 230 specified in broadcast page request 220. MSC-L 230 may indicate specific MSC 115 identifiers, or indicate an entire DCM 105, or indicate a geographic area upon which service provider 125 can determine specific MSC identifiers based on the MSCs 115 known to be associated with the geographic area specified by the service subscriber 235.

Once service provider 125 receives the broadcast page request 220 and determines the MSCs 115 that are to receive the broadcast page 120, and further, which Virtual Device Identifier 121 to broadcast, service provider 120 generates broadcast page 120 including the selected Virtual Device Identifier, and transmits the broadcast page 120 to the selected MSCs 115 via Interface 250.

When remote devices 150 enter into a service area or coverage area 130, they automatically register with a database connected with MSC 115 controlling that service area. The database is known as a Visitor Location Registry (VLR), which holds a listing of all Primary Device Identifiers 160 for each of the remote devices 150 operating within the Digital Cellular Network 200 controlled by the MSC 115.

As shown, each of the remote devices 150A, 150B, and 150C have their Primary Device Identifiers 160 registered in VLR-DB 205, as depicted by registered Primary Device Identifiers 210. Conversely, the Virtual Device Identifiers 165 or Secondary Device Identifiers are neither registered with, nor recognized by VLR Database 205. Registered Primary Device Identifiers 210 includes Primary Device Identifier values "123," "456," and "789," corresponding to remote devices 150A-C, however, the Virtual Device Identifier values active on the network, specifically Virtual Device Identifier value "555" of remote devices 150A and 150B, is not present within registered Primary Device Identifiers 120.

In one embodiment, SP 125 receives broadcast page request 220 from service subscriber 235, generates broadcast page 120 indicating Virtual Device Identifier 121 based on broadcast page request 220 and transmits broadcast page 120 to MSC 115 via Interface 250. In this embodiment, MSC 115 transmits broadcast page 120 to base station 120 which broadcasts the page event 120 to all remote devices in coverage area 130. Each remote device 150 compares the Virtual Device Identifier indicated in broadcast page 120 against Primary Device Identifiers 160 and Virtual Device Identifiers associated with the remote devices 150. In some embodiments, remote devices 150A and 150B determine that Virtual Device Identifier 121 indicated within broadcast page 120 matches a Virtual Device Identifier associated with remote devices 150A and 150B, despite the Virtual Device Identifier indicated 121 not being registered in VLR-DB 205 as one of many registered Primary Device Identifiers 120.

Figure 3A:
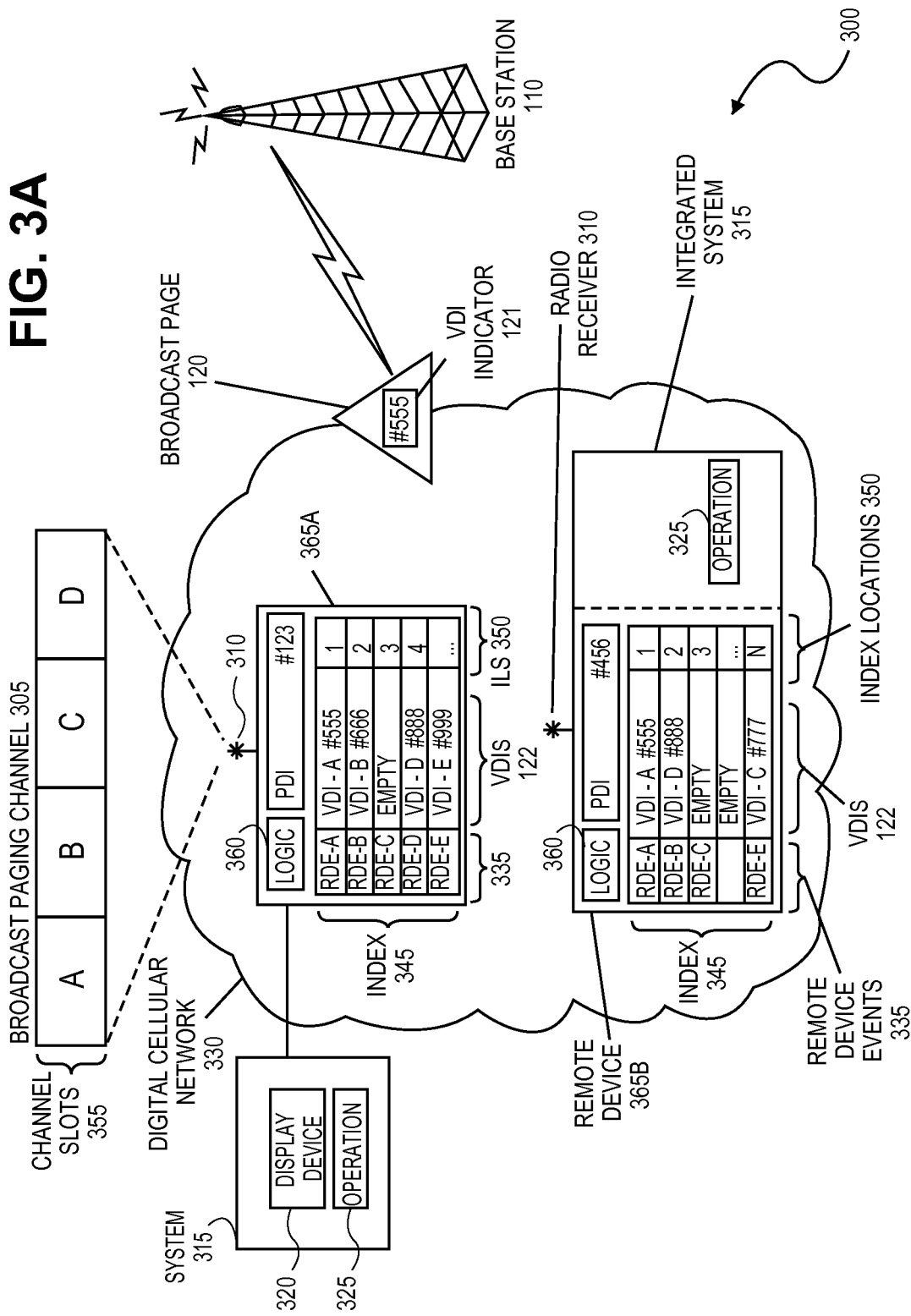
FIG. 3A illustrates a diagrammatic representation of an embodiment of remote devices enabled to monitor broadcast pages and initiate remote device events responsive to select broadcast pages.

FIG. 3A illustrates a diagrammatic representation of remote devices 300 enabled to monitor broadcast pages 120 and initiate remote device events 335 responsive to select broadcast pages 120, in accordance with one embodiment of the invention.

Base station 110 is shown transmitting broadcast page 120, with Virtual Device Identifier indicator 121, to Digital Cellular Network (DCN) 330 where remote devices 365A and 365B are operating. Remote devices 365A and 365B each have logic 360, for example, software, instructions, firmware, etc., enabling remote devices 365A-B to perform tasks and operations, for example, through the use of a central processing unit (CPU) or other computing apparatus.

Remote device 365A includes Primary Device Identifier value "123" and remote device 365B includes Primary Device Identifier value "456." Remote devices 365A-B also include index 345, which has a listing of remote device events 335, each mapped to one of several Virtual Device Identifiers 122, based on index locations 350. Index 345 creates an association or "mapping" between particular Virtual Device Identifiers 122 and specific remote device events 335, through for example, a table. The behavior that remote devices 365A-B exhibit upon receipt of a matching Virtual Device Identifier is controlled via index 345, and the index location that a matching Virtual Device Identifier 122 is stored at within index 345. It is not necessary for all remote devices 365A-B sharing a common Virtual Device Identifier to exhibit the same behavior upon receipt of a broadcast page indicating that Virtual Device Identifier.

For example, in one embodiment, remote device 365A shows VDI-D stored at index location 350-4 which is associated with remote device event 335-D, indicated by RCE-D. Therefore, remote device 335A, upon monitoring a broadcast page 120 with a Virtual Device Identifier indicator 121 value of "888," will perform remote device event 335D associated with Virtual Device Identifier value "888." Conversely, remote device 365B illustrates VDI-D stored at a different index location, specifically index location 350-2 which is associated with remote device event 335-B, as indicated by RCE-B. Thus, upon receiving the same broadcast page 120 indicating Virtual Device Identifier 121 value "888," remote devices 365A and 365B will perform a different remote device events, though each will perform some remote device event 335, as each remote device 365A-B is associated with the Virtual Device Identifier value "888" transmitted with broadcast page 120 in this particular example.

In an alternative embodiment, both remote devices 365A-B perform the same remote device event 335 upon receiving, for example, broadcast page 120 indicating Virtual Device Identifier value "555" which is stored at index location 350-1 of each remote device 365A-B.

Remote device 365A is communicably connected with system 315 which includes display device 320 and operation 325. Remote device 365B is integrated into a single unit with integrated system 315 which includes operation 325. Operation 325 is a task or action that is initiated by remote device 365 (e.g., operation 325 may be initiated by remote device 365A or 356B or both or other remote devices similarly configured) based on a remote device event 335 responsive to a broadcast page 120 having a matching Virtual Device Identifier 122. System 315, whether integrated or communicably connected, is an electronic or electromechanical system, machine, device, or apparatus connected with remote device 365 in such a way that it may be controlled, at least to an extent, by remote device 365B.

For example, in one embodiment, operation 325 at a connected or integrated system 315 is selected from the group of tasks including: altering the energy consumption rate of an electrical appliance via an electronic signal or via electromechanical means; altering a current state in a state machine communicably attached with a remote device 365; prompting a user with content information via a display device 320 connected with the remote device 365A; activating or deactivating a machine 365A communicably attached with the remote device; altering a configuration of a system 315 communicably attached or integrated with a remote device 365; transmitting an emergency warning message to a public announcement system 315 communicably attached with the remote device 365; displaying 320 an emergency warning message to a personal computing device 315 communicably attached with the remote device 365A; and initiating communication with a service provider responsive to broadcast page 120.

Some wireless communication systems, such as CDMA compatible digital communication networks, operate with the use of channel slots 355 that divide up a broadcast paging channel 305 into slices or parts. Remote device 365A is shown monitoring the broadcast paging channel via a radio receiver 310. Use of channel slots 355 can conserve energy, especially if operating from battery power, by intermittently monitoring select channel slots 355A-D rather than monitoring the entire broadcast paging channel 305. Doing so effectively allows remote devices 365 to reduce energy consumption by operating a radio receiver 310, used for monitoring broadcast paging channel 305, only a portion of the time. However, to function properly, DCN 330 must synchronize the broadcast paging channel 305 among remote devices 365, so that remote device radios know when to monitor channel slots 355 and so that base station 110 doesn't attempt to broadcast a Primary Device Identifier during a channel slot 355 not monitored by an intended remote device 365.

In one embodiment, remote device 365 (e.g., remote device 365A or 365B or other similarly configured remote devices) monitors all channel slots 355 capable of transmitting a broadcast page to ensure that broadcast pages are received, even when those broadcast pages are transmitted on a particular channel slot 355 that is not associated with a PDI of the same remote device 365. For example, a remote device having a PDI with a value of "123" may ordinarily only need to monitor channel slot 355A, as all pages sent to that remote device will be scheduled by the service provider for transmission in channel slot 355A. Nevertheless, the remote device 365 may monitor channel slots 355A-D so as to ensure the receipt of broadcast pages scheduled by the service provider in channel slots other than 355A, such as channel slots 355B-D as depicted in FIG. 3A. In an alternative embodiment, remote device 365 is configured to monitor one or more channel slots 355 for broadcast pages which may be transmitted in a channel slot associated with either the PDI of the remote device or any of the VDIs associated with the remote device.

For example, because Primary Device Identifiers in a CDMA based system are only assigned to a single remote device 365, base stations can instruct remote devices to only listen to particular channel slots 355, such as every other channel slot or every third channel slot, and so on. So long as base station 110 transmits page events indicating Primary Device Identifiers during the channel slots 355 monitored by a remote device to which the Primary Device Identifier is assigned, the DCN 330 will function properly, as the remote device 365 will detect the page event and also conserve energy by not unnecessarily listening to channel slots 355 pre-determined not to be used for broadcasting page events to that particular remote device 365. Some remote devices instructed to not monitor the channel slot 355A-D used will miss the page event, but this does not matter as the Primary Device Identifier would be ignored by those remote devices anyway. This process is well understood in the art, however, it is described here as to the extent it affects implementation of the present invention.

On those digital cellular networks 330 employing the use of channel slots 355, including CDMA compatible communication systems, it is necessary to ensure that broadcast pages 120 indicating Virtual Device Identifiers are broadcast during each possible channel slot 355 so that remote devices assigned to differing channel slots have an opportunity to monitor or "hear" the broadcast page. Thus, DCNs 330 employing a single channel without the use of channel slots 355 will require only one broadcast page 120, as all remote devices 365 in the coverage area or the DCN 330 will "hear" the broadcast page. In some embodiments where multiple channel slots 355 are used, but it is not feasible or not desirable to have remote devices monitor the multiple channel slots 355 (e.g., because the remote devices operate on battery), service providers must transmit a broadcast page 120 twice for DCNs 330 employing two channel slots and transmit broadcast page 120 three times for DCNs 330 employing a three channel slot rotation, and so forth. This approach requires no modification to existing base stations 110 or MSCs 115, as service providers 125 can simply send the broadcast page 120 the requisite number of times, specifying the appropriate channel slot for each of the repeated broadcast pages 120.

When broadcast pages 120 are transmitted on each channel slot 355, all remote devices 365 in a coverage area may be able to detect the broadcast page, whether those remote devices have a corresponding Device Identifier or not. However, only those remote devices having a matching Virtual Device Identifier will process the broadcast page 120 and perform operations responsive to receiving the broadcast page.

Figure 3B:
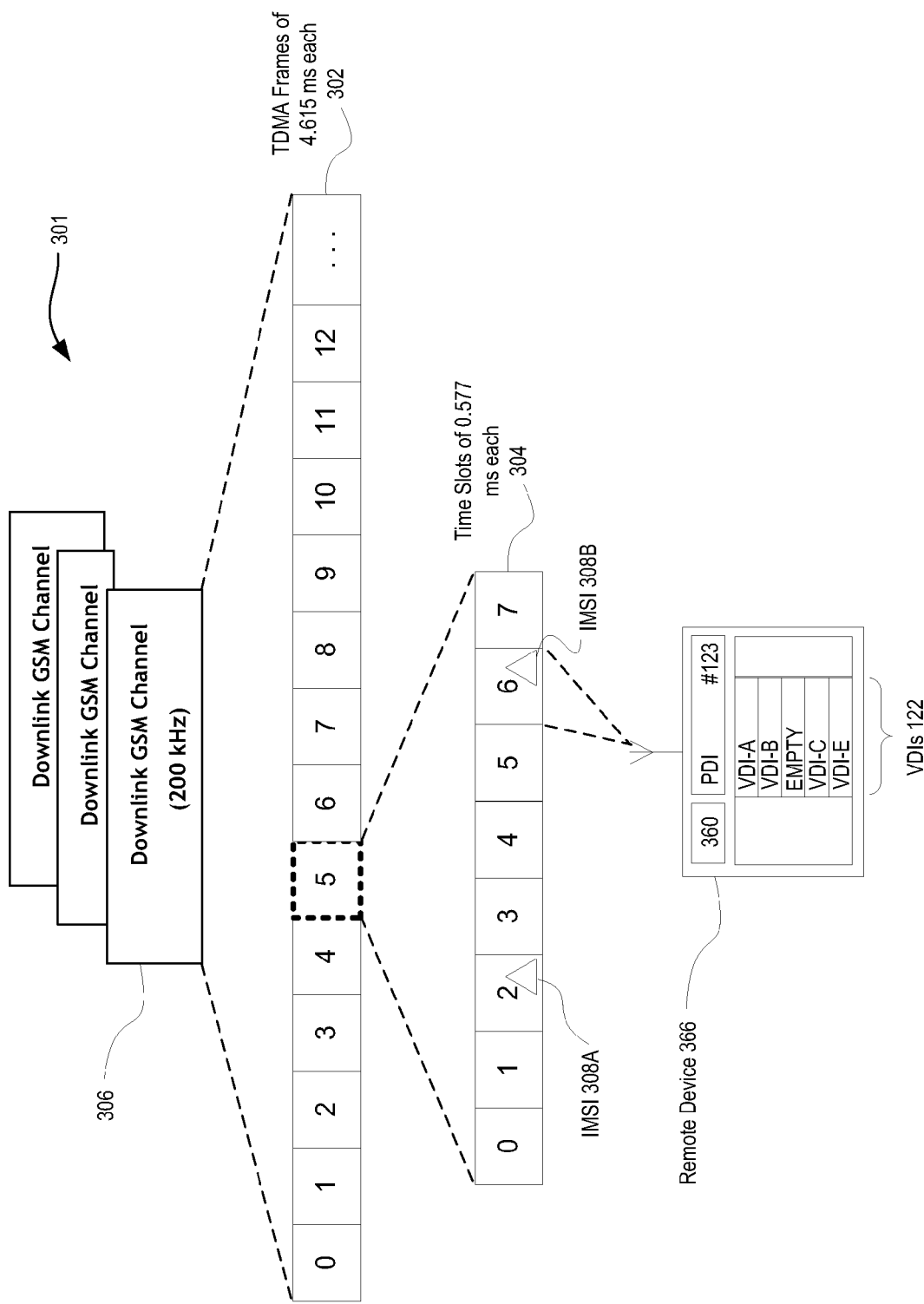
FIG. 3B illustrates an alternative diagrammatic representation of a remote device enabled to monitor a broadcast page in accordance with one embodiment of the invention.

FIG. 3B illustrates an alternative diagrammatic representation 301 of a remote device 366 enabled to monitor a broadcast page in accordance with one embodiment of the invention.

The concepts described herein may be generally applicable to a variety of digital communication networks, however, networks implementing different communication standards may require different techniques for enabling multiple remote devices operating within the communications network to receive a broadcast page that is directed to multiple remote devices simultaneously. For example, a CDMA compatible digital communications system relies upon the use of "channel slots" 335, such as those described in FIG. 3A, to transmit a broadcast page, whereas a GSM compatible digital communications system relies instead on the use of "time slots" within a Time Division Multiple Access (TDMA) channel to transmit broadcast pages, such as the TDMA structure depicted within FIG. 3B.

Depicted in FIG. 3B are multiple downlink GSM channels 306 operating at a specified frequency (e.g., 200 kHz). A service provider may transmit content, data, control codes, pages, broadcast pages, and other information to multiple devices utilizing the same frequency, by dividing up the communications on the frequency into slices of time of a known duration, such as time slots 304, each of which have a duration of 0.577 milliseconds each in the example shown. A group of time slots 304 make up a TDMA frame 302 which constitutes the sum total of the individual time slots (e.g., a 4.615 millisecond TDMA "frame" 302 consists of eight time "slots" 304 of 0.577 milliseconds each).

A remote device operating in a GSM compatible network, such as remote device 366 may monitor specified time slots 304 within a downlink GSM channel 306 for information that is or may be applicable to the remote device 366. For example, a remote device 366 may monitor time slot #6 of every TDMA frame 302 on a Paging Channel (PCH) to determine whether or not a page is being sent to the remote device. Some GSM based network implementations may require that multiple "time slots" 304 on a paging channel be monitored to construct a single page or broadcast page. Stated differently, remote device 366 may monitor, for example, four consecutive time slots 366 on a paging channel to construct what may be referred to as a "paging block." For example, remote device 366 may monitor and interpret paging slots "0" through "4" of a single TDMA frame 302 as a single "paging block" or may monitor and interpret time slot "6" within four consecutive TDMA frames 302 within a downlink GSM channel 306 (e.g., a downlink GSM PCH channel) as a single "paging block." Other combinations and numbers of time slots 304 may obviously be used as well, as understood by those in the art. Remote device 366 may similarly monitor an assigned traffic channel (e.g., multiple individual time slots within a series of TDMA frames on a downlink GSM traffic channel) for telephony communications routed to the remote device (such as a cell phone) via a service provider.

The remote device 366 in a GSM compatible network is able to determine whether a particular page event transmitted via a paging channel is directed to the remote device 366 by comparing an IMSI 308 transmitted within the monitored time slot 304, or within multiple monitored time slots 304 constituting a paging block, on a paging channel (e.g., one of downlink GSM channels 306) against a primary device identifier of the remote device 366 (e.g., against an IMSI 308 within the remote device used as a PDI).

Similar to the CDMA compatible network described via FIG. 3A, the primary device identifier or PDI of a remote device 366 operating in a GSM compatible network uniquely identifies that remote device amongst all remote devices capable of operating within the GSM network. However, the remote device 366 may be programmed or associated with virtual device identifiers or VDIs, such as those described above, that are not necessarily unique to a particular remote device 366, but rather, may be associated with a particular group or class of remote devices. For example, a group of remote devices may include all remote devices associated with a particular customer, all remote devices associated with a particular type of equipment (such as a residential air conditioning unit connected with the remote device), or a list of cellular customers subscribed to a particular event (e.g., mobile GSM subscribers that agreed to receive emergency notifications relating to weather), and so forth.

A remote device monitoring a particular time slot 304 of a paging channel within a GSM compatible network may recognize that it is associated with a VDI 122 that matches a broadcast page's identifying IMSI 308 transmitted within a TDMA timeslot 304 and then trigger an action based on receipt of that page, such as monitoring a specified portion of a TDMA channel for additional content information, triggering an acknowledgement, or an event, consistent with such actions as described herein.

Remote devices 366 operating within a GSM compatible network may be configured to monitor only specified TDMA timeslots within a paging channel, for example, to conserve battery life by reducing the amount of radio activity. In such instances, a service provider transmitting a page to that remote device 366 will coordinate pages destined for the remote device 366 so that those page requests are transmitted in an appropriate time slot that is known to be monitored by the remote device. However, remote devices 366 having VDI's associated with them, may be configured to monitor multiple TDMA time slots 304 on the paging channel, or in some embodiments, all time slots 304 within the paging channel, to ensure that broadcast pages destined for the remote device are received, without requiring that all remote devices 366 in a particular group associated with the VDI be configured to monitor the same TDMA time slot 304.

For example, within a paging channel, TDMA time slots "0," "2," "4," and "6" may be allocated to transmitting pages in a GSM system, but each active primary device identifier associated with remote devices 366 within the GSM system may be associated with just one of the four allowable TDMA time slots 304, thus allowing the remote device to only monitor one of the four timeslots 304 for pages that may be directed to the remote device 366. By instructing a remote device to monitor all of the timeslots for IMSI 308 values transmitted with a broadcast page, a virtual device identifier of the remote device can be matched against the transmitted IMSI 308 regardless of which timeslot the IMSI 308 value is transmitted in.

In one embodiment, remote devices 366 are not configured to monitor multiple paging time slots 304 and a service provider responsible for transmitting a broadcast page instead transmits the broadcast page once for each TDMA time slot 304 configured to transmit broadcast pages. For example, a service provider may transmit the same broadcast page via TDMA time slots "0," "2," "4," and "6," or which ever time slots 304 are capable of carrying the broadcast page and thus, potentially monitored by members of the target group of remote devices for the broadcast page.

IMSI values 308 transmitted within a broadcast page may conform to a designated format in which the IMSI value has 3 digits which designate a country code, two or three digits which represent a particular network within Europe or the United States respectively, and a serial number which consists of the remaining nine to ten digits. Within the serial number portion of the IMSI value, a group of remote devices 366 may be designated by, for example, the last three digits of the serial number portion of the IMSI value. In some embodiments, remote devices may be configured to accept or process a particular broadcast page based upon the last three digits representing a group of remote devices (in addition to the country code and network code) and treat the remaining six or seven digits of the serial number as a separate field, such as a content field or command field on which to base, for example, the triggering of an event within the remote device. Using only a portion of the IMSI value for matching purposes may be referred to as a "partial match" or a "wildcard match."

Figure 4A:
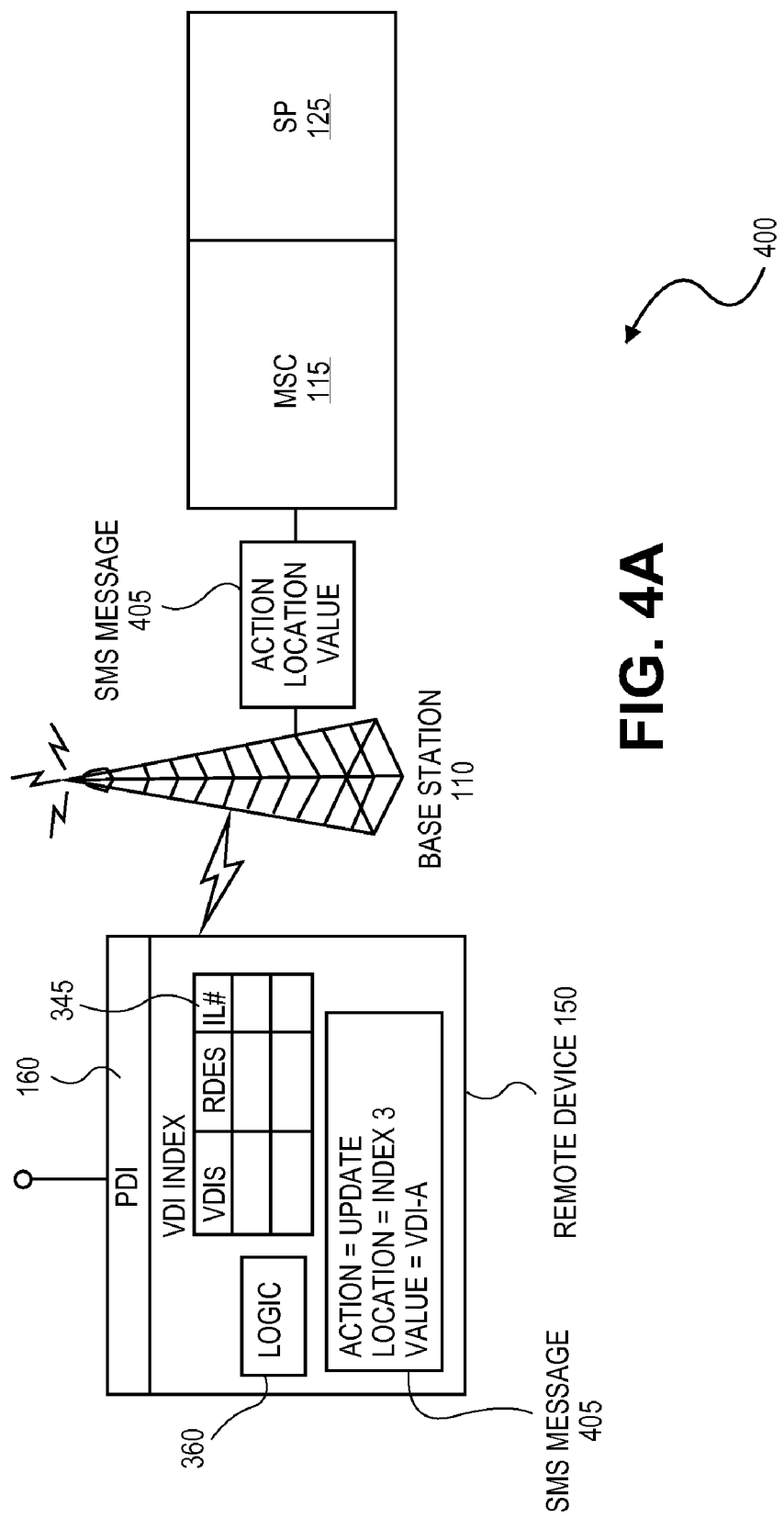
FIG. 4A illustrates an exemplary network architecture connected with a service provider capable of updating a Virtual Device Identifier index of a remote device, in accordance with a particular embodiment.

FIG. 4A illustrates network architecture 400 connected with service provider 125 capable of updating a Virtual Device Identifier index 345 of remote device 150, in accordance with one embodiment of the invention. Service provider 125 is shown transmitting Short Message Service (SMS) message 405 to remote device 150 via base MSC 115 and base station 110. SMS message 405 is addressed to remote device 150 via its (dedicated) Primary Device Identifier, which is registered on the digital cellular network.

Service provider 125 can send a message directly to remote device 150 via SMS message 405, providing unique instructions to a unique remote device using a Primary Device Identifier, or service provider 125 can send broadcast page 120 to a group of remote devices 150 via a common Virtual Device Identifier instructing each remote device associated with the Virtual Device Identifier to update in accordance with a common set of instructions.

SMS message 405 includes an "action," a "location," and a "value." The action, location, and value parameters provide the necessary information for remote device 150 to perform an update to its Virtual Device Identifier index 345. Specifically, the action indicates that the remote device 150 is to perform an update, addition, or deletion of one of a plurality of index locations in the remote device Virtual Device Identifier index 345. The location specifies the index location to which the action applies, and the value parameter indicates a Virtual Device Identifier value to be updated, added to, or deleted from the index location as specified by the action and the index location identifier.

Service provider 125 can send messages to remote devices using alternative message formats as well, including for example, via Open Mobile Alliance Device Management (OMA-DM) communication protocol, via a MicroBurst compatible communication protocol, or via text messages.

Figure 4B:
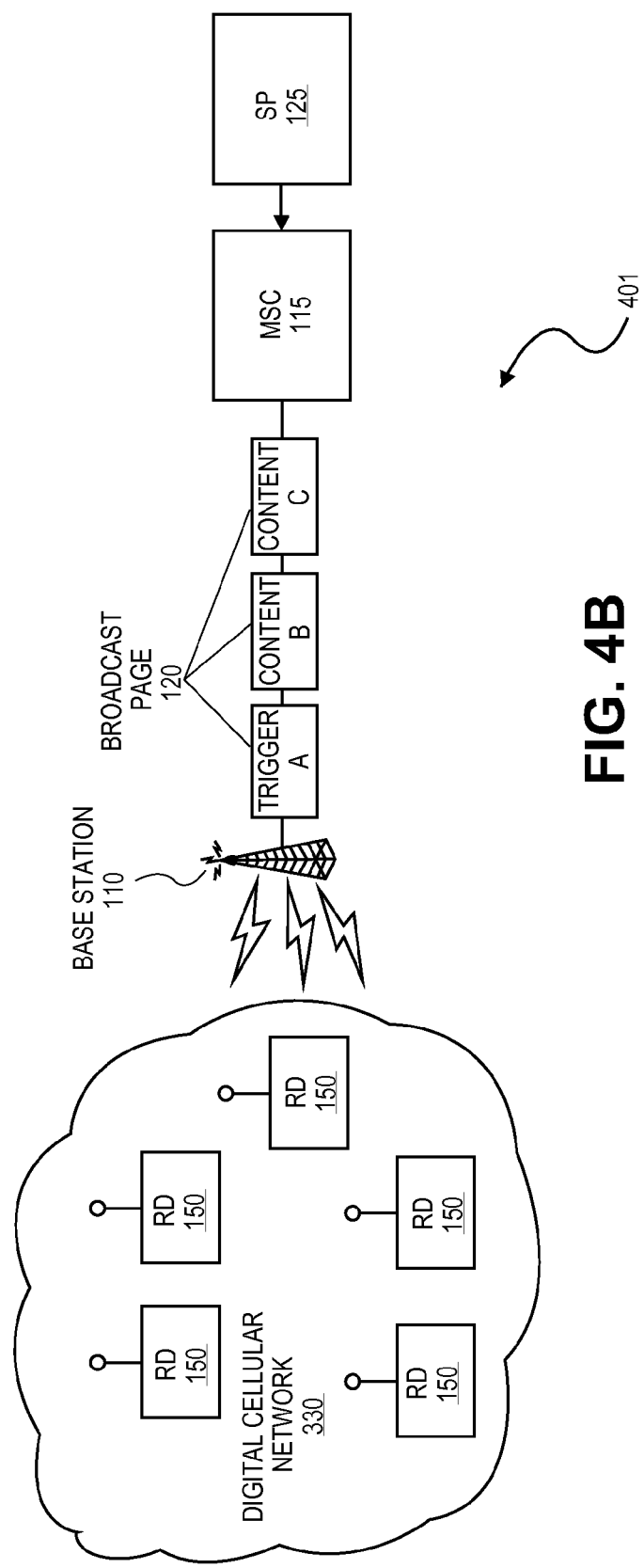
FIG. 4B illustrates an exemplary network architecture connected with a service provider capable of sending alphanumeric content messages to multiple remote devices via a broadcast page, in accordance with an another embodiment.

FIG. 4B illustrates a network architecture 401 connected with service provider 125 capable of sending alphanumeric content messages to multiple remote devices via a broadcast page, in accordance with one embodiment of the invention. Service provider 125 is shown transmitting broadcast messages 120A, 120B, and 120C to remote devices 120 in digital cellular network 330 via MSC 115 and base station 110.

Broadcast page 120A acts as a trigger having a Virtual Device Identifier recognized by remote devices 150. Broadcast page 120A informs the remote devices that subsequent broadcast pages will be following, each carrying payload data, rather than only Virtual Device Identifier indicators. Stated differently, the triggering broadcast page 120A performs synchronization or "training" functions to prepare the remote devices 150 for the incoming content based broadcast pages 120B and 120C. Multiple triggering broadcast pages 120A may also be used. Broadcast page 120A may inform remote devices 150 to anticipate a subsequent broadcast page having a particular mask, or a format structure indicating that it is carrying payload data.

For example, a Virtual Device Identifier may have a 10-digit sequence, meaning that it has a 10-digit "address space," or 10 positions, each position able to carry a numeric value. Some portion of the Virtual Device Identifier must be used to perform an address function, however, a portion of the address space, e.g., the Virtual Device Identifier to be indicated by broadcast page 120, may be used to carry number sequences represented an alphanumeric message or a portion of an alphanumeric message. The amount of the address space able to be used depends on how large of a block of Device Identifiers are owned by service provider 125 and otherwise unassigned and unused.

For example, in one embodiment, SP 125 owns Device Identifiers 555-555-0000 through 555-555-9999 meaning that SP 125 could allocate the trailing four positions of a Virtual Device Identifier to carrying payload data without interfering with assigned and registered Primary Device Identifiers on a DCN 330 or active Virtual Device Identifiers on DCN 330. Using the block of 10,000 Device Identifiers in the range from 555-555-0000 through 555-555-9999, SP 125 could trigger remote devices 150 via broadcast page 120A to listen for any subsequent broadcast page 120B-C beginning with 555-555-xxxx, then process the broadcast page by constructing a message or a partial message from the last four digits up to potentially 10,000 different message combinations. In another embodiment, SP 125 owns Device Identifiers 555-500-0000 through 555-599-9999 meaning that SP 125 could allocate the trailing six positions of a Virtual Device Identifier to carrying payload data, thereby using fewer messages than the previous example having only four positions for payload data.

In yet another embodiment, SP 125 uses dispersed Device Identifiers rather than a block of Device Identifiers, where each individual Device Identifier represents a symbol, codeword, or instruction that can be interpreted to construct a complete alphanumeric message at the remote terminals. For example, after a triggering broadcast page 120A, SP 125 sends a series of content broadcast pages 120B-C, each beginning with a specific wildcard sequence, such as 555-555-xxxx, but instead of the last four positions carrying payload data, each trailing 4-position sequence represents a symbol. For example, 555-555-1234 is a first symbol, and 555-555-6789 is a second symbol, but the entire 10,000 Device Identifier block need not be available for carrying payload data, only enough Device Identifiers for the number of symbols or code words desired to be interpreted. More particularly, all 26 letters of the alphabet could be represented with 26 unique Virtual Device Identifiers.

FIG. 5A is a flow diagram illustrating a method 500 at a service provider for generating and sending broadcast pages to multiple remote devices, in accordance with one embodiment of the present invention. FIG. 5B is a flow diagram illustrating a method 501 at a remote device for monitoring broadcast pages and initiating remote device events based on select broadcast pages, in accordance with one embodiment of the present invention. Methods 500 and 501 may be performed by processing logic that may comprise hardware (e.g., circuitry, dedicated logic, programmable logic, microcode, etc.), software (e.g., instructions run on a processing device to perform hardware simulation), or a combination thereof. In one embodiment, method 500 is performed by a service provider, such as service provider 125 of FIG. 1, and method 501 is performed by a remote device, such as remote device 150A of FIG. 1. Some of the method operations set forth in below are optional, and are found in one embodiment, but not all embodiments.

Referring to FIG. 5A, method 500 begins with processing logic at a service provider receiving a broadcast page request from a service subscriber, wherein the broadcast page request has a request message and one or more MSC-Ls (block 505).

At block 510, the service provider selects one or more digital cellular markets to receive a broadcast page based on the one or more MSC-Ls. At block 515, the service provider selects a Virtual Device Identifier to include with the broadcast page based on the request message from the service subscriber. At block 520, the service provider generates the broadcast page indicating the Virtual Device Identifier, wherein the Virtual Device Identifier is associated with each of a plurality of remote devices. At block 525, the service provider sends the broadcast page to the digital cellular markets selected, for transmission to the remote devices.

Referring to FIG. 5B, method 501 begins with processing logic at a remote device monitoring a broadcast page via a radio receiver, the broadcast page indicating a Device Identifier (block 575).

At block 580, the remote device compares the Device Identifier of the broadcast page against a Virtual Device Identifier and a Primary Device Identifier of the remote device. At block 585, processing logic initiates a remote device event via the remote device when the Device Identifier of the broadcast page matches a Virtual Device Identifier of the remote device. At block 590, the remote device initiates a response to the broadcast page when the Device Identifier of the broadcast page matches a Primary Device Identifier of the remote device. At block 595, the remote device ignores the broadcast page when the Device Identifier of the broadcast page does not match the Primary Device Identifier or any Virtual Device Identifier of the remote device.

FIG. 6 illustrates a diagrammatic representation of a machine in the exemplary form of a computer system 600 within which a set of instructions, for causing the machine to perform any one or more of the methodologies discussed herein, may be executed. In alternative embodiments, the machine may be connected (e.g., networked) to other machines in a Local Area Network (LAN), an intranet, an extranet, the Internet, or via a digital cellular network. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 600 includes a processor 602, a main memory 604 (e.g., read-only memory (ROM), flash memory, dynamic random access memory (DRAM) such as synchronous DRAM (SDRAM) or Rambus DRAM (RDRAM), etc.), a static memory 606 (e.g., flash memory, static random access memory (SRAM), etc.), and a secondary memory 618 (e.g., a data storage device), which communicate with each other via a bus 630.

Processor 602 represents one or more general-purpose processing devices such as a microprocessor, central processing unit, or the like. More particularly, the processor 602 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processor 602 may also be one or more special-purpose processing devices such as an application specific integrated circuit (ASIC), a field programmable gate array (FPGA), a digital signal processor (DSP), network processor, or the like. Processor 602 is configured to execute the processing logic 626 for performing the operations and operations discussed herein.

The computer system 600 may further include a network interface device or a radio receiver 608. The computer system 600 also may include a video display unit 610 (e.g., a liquid crystal display (LCD) or a cathode ray tube (CRT)), an alphanumeric input device 612 (e.g., a keyboard), a cursor control device 614 (e.g., a mouse), and a signal generation device 616 (e.g., a speaker).

The secondary memory 618 may include a machine-readable storage medium (or more specifically a computer-readable storage medium) 631 on which is stored one or more sets of instructions (e.g., software 622) embodying any one or more of the methodologies or functions described herein. The software 622 may also reside, completely or at least partially, within the main memory 604 and/or within the processing device 602 during execution thereof by the computer system 600, the main memory 604 and the processing device 602 also constituting machine-readable storage media. The software 622 may further be transmitted or received over a network 620 via the network interface device or the radio receiver 608.

While the machine-readable storage medium 631 is shown in an exemplary embodiment to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine to perform any one or more of the methodologies of the present invention. The term "machine-readable storage medium" shall accordingly be taken to include, but not be limited to, solid-state memories, and optical and magnetic media.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

The invention claimed is:

1. A method at a service provider comprising:
    selecting one or more digital cellular markets to receive a broadcast page, each digital cellular market providing wireless communication services to a geographic region;
    generating the broadcast page at the service provider, the broadcast page indicating a Virtual Device Identifier associated with a plurality of remote devices in each of the digital cellular markets selected, wherein each of the remote devices comprises a Primary Device Identifier uniquely identifying the remote device within the digital cellular markets and the Virtual Device Identifier associated with the plurality of remote devices; and
    sending the broadcast page to each digital cellular market selected, for transmission to the remote devices to send a message to remote devices having the Virtual Device Identifier.

2. The method of claim 1, wherein the plurality of remote devices in each of the digital cellular markets selected comprise one of:
    a plurality of Code Division Multiple Access (CDMA) compatible devices operating in a CDMA compatible network; and
    a plurality of Global System for Mobile communications (GSM) compatible devices operating in a GSM compatible network.

3. The method of claim 1, wherein each Primary Device Identifier is registered with a Visitor Location Register (VLR) database associated with the digital cellular market in which the remote device associated with the Primary Device Identifier operates.

4. The method of claim 3, wherein the Virtual Device Identifier is not registered with, or recognized by, the VLR database.

5. The method of claim 4, wherein the Virtual Device Identifier of the broadcast page is detected by all remote devices operating within the one or more digital cellular markets sent the broadcast page, and wherein the Virtual Device Identifier triggers a remote device event at each of the plurality of remote devices associated with the Virtual Device Identifier.

6. The method of claim 1, wherein each digital cellular market comprises a Mobile Switching Center (MSC) communicably interfaced with a plurality of base stations, each base station communicably interfaced with at least a portion of the remote devices in the digital cellular market.

7. The method of claim 1, wherein each digital cellular market comprises a group of Mobile Switching Centers (MSCs) associated with a geographic area, each MSC communicably interfaced with a plurality of base stations, each base station communicably interfaced with at least a portion of the remote devices in the digital cellular market.

8. The method of claim 1, further comprising:
    receiving a broadcast page request from a service subscriber, wherein the broadcast page request comprises a request message and one or more Mobile Switching Center Identifications (MSC-Ls) describing the one or more digital cellular markets to receive the broadcast page.

9. The method of claim 8, wherein the request message comprises message content selected from the group comprising:
    the Virtual Device Identifier to be sent with the broadcast page;
    a remote device event to be triggered at each remote device associated with the Virtual Device Identifier;
    a local event code describing an event at the service subscriber; and
    data from the service subscriber to be sent to all the remote devices associated with the Virtual Device Identifier.

10. The method of claim 8, further comprising:
    selecting at the service provider, the Virtual Device Identifier to send with the broadcast page based on the request message from the service subscriber.

11. The method of claim 1, wherein sending the broadcast page to each of the digital cellular markets selected comprises:
    communicating the broadcast page comprising the Virtual Device Identifier to one or more Mobile Switching Centers (MSCs) identified by the digital cellular markets selected, wherein the broadcast page is communicated to each of the MSCs individually.

12. The method of claim 11, wherein the MSCs to further transmit the broadcast page to the plurality of remote devices selected via one of:
    one or more timeslots in a Time Division Multiple Access (TDMA) paging channel monitored by the plurality of remote devices selected; and
    one or more channel slots in a Code Division Multiple Access (CDMA) paging channel monitored by the plurality of remote devices selected.

13. The method of claim 11, wherein each of the MSCs identified communicates the broadcast page having the Virtual Device Identifier to each of a plurality of base stations communicably attached with the MSC and wherein each base station to broadcast the Virtual Device Identifier to all remote devices operating within communication range of the base station.

14. A system comprising:
    means for selecting one or more digital cellular markets to receive a broadcast page, each digital cellular market providing wireless communication services to a geographic region;

means for generating the broadcast page, the broadcast page identifying a Virtual Device Identifier associated with a plurality of remote devices in each of the digital cellular markets selected, wherein each of the remote devices comprises a dedicated Primary Device Identifier uniquely identifying the remote device within the digital cellular markets and the Virtual Device Identifier associated with the plurality of remote devices; and means for sending the broadcast page to each digital cellular market selected, for transmission to the remote devices to send a message to remote devices having the Virtual Device Identifier.

15. The system of claim 14, further comprising:

means for sending a Virtual Device Identifier update message to a remote device uniquely identified within the one or more digital cellular markets via the dedicated Primary Device Identifier assigned to the remote device, wherein the Virtual Device Identifier update message comprises:
   an action indicating an update, addition, or deletion of one of a plurality of index locations at the remote device, each index location storing a Virtual Device Identifier and a remote device event to be performed when the Virtual Device Identifier of the index location is received via a broadcast page;
   an index location identifier indicating the index location to which the action applies; and
   a Virtual Device Identifier to be updated, added to, or deleted from the index location as specified by the action and based further upon the index location identifier.

16. The system of claim 14, further comprising:

means for receiving a broadcast page request from a service subscriber, wherein the broadcast page request comprises:
   a broadcast page request message indicating a service subscriber event to use in selecting the Virtual Device Identifier for transmission with the broadcast page, and
   one or more digital cellular market selections describing the one or more digital cellular markets to receive the broadcast page; and
wherein the system further comprises means for selecting the Virtual Device Identifier to be identified by the broadcast page.

17. A remote device comprising:

a radio receiver to monitor for a broadcast page from a digital cellular network, wherein the broadcast page indicates a Virtual Device Identifier associated with a plurality of remote devices in the digital cellular network including the remote device;

a Primary Device Identifier to uniquely identify the remote device among all remote devices communicably attached with the digital cellular network;

an index comprising one or more index locations, each index location to map the Virtual Device Identifier to a remote device event, wherein the remote device event describes an operation to be initiated by the remote device responsive to the broadcast page indicating the Virtual Device Identifier associated with the plurality of remote devices in the digital cellular network including the remote device; and logic to trigger the remote device event when a mapped Virtual Device Identifier is monitored at the remote device within the broadcast page.

18. The remote device of claim 17, wherein the index comprising the one or more index locations comprises a table having a Virtual Device Identifier column and a remote device event column and wherein each of the one or more index locations corresponds with a row in the table, each row associating one of a plurality of Virtual Device Identifiers with one of a plurality of remote device events.

19. The remote device of claim 17, wherein the remote device event is selected from the group comprising:
   altering the energy consumption rate of an electrical appliance via an electronic signal or by electromechanical means;
   altering a current state in a state machine communicably attached with the remote device;
   prompting a user with content information via a display device connected with the remote device;
   activating or deactivating a machine communicably attached with the remote device;
   altering a configuration of a system communicably attached with the remote device;
   transmitting an emergency warning message to a public announcement system communicably attached with the remote device;
   displaying an emergency warning message to a personal computing device communicably attached with the remote device; and
   initiating communication with the service provider responsive to the broadcast page.

20. The remote device of claim 17, further comprising:
a Virtual Device Identifier update module to:
   receive a Virtual Device Identifier update message from a service provider via the radio receiver; and
   update the index based on the Virtual Device Identifier update message.

21. The remote device of claim 20, wherein the Virtual Device Identifier update message comprises:
   an action indicating a change, addition, or deletion of one of the plurality of index locations;
   an index location identifier indicating to index location to which the action applies; and
   a Virtual Device Identifier to be changed, added, or deleted from the index location indicated based on the action indicated.

22. The remote device of claim 21, wherein the Virtual Device Identifier update message is received at the remote device in accordance with a communication protocol selected from the group comprising:
   a Short Message Service (SMS) communications protocol;
   an Open Mobile Alliance Device Management (OMA-DM) communication protocol;
   a wireless IP data session communication protocol; and
   a MicroBurst compatible communication protocol.

23. The remote device of claim 17, wherein the radio receiver monitors all broadcast pages in communication range of the remote device from the digital cellular network and wherein the logic of the remote device further to:
   compare a Device Identifier associated with each broadcast page sent against the Primary Device Identifier associated of the remote device and accept the broadcast page when the Device Identifier matches the Primary Device Identifier;
   compare the Device Identifier associated with each broadcast page against each index location and accept the broadcast page when any one of the index locations have a Virtual Device Identifier matching the Device Identifier of the broadcast page; and
   ignore the broadcast page when neither the Primary Device Identifier nor any Virtual Device Identifier in the index matches the Device Identifier of the broadcast page.

* * * * *